Figure 1:
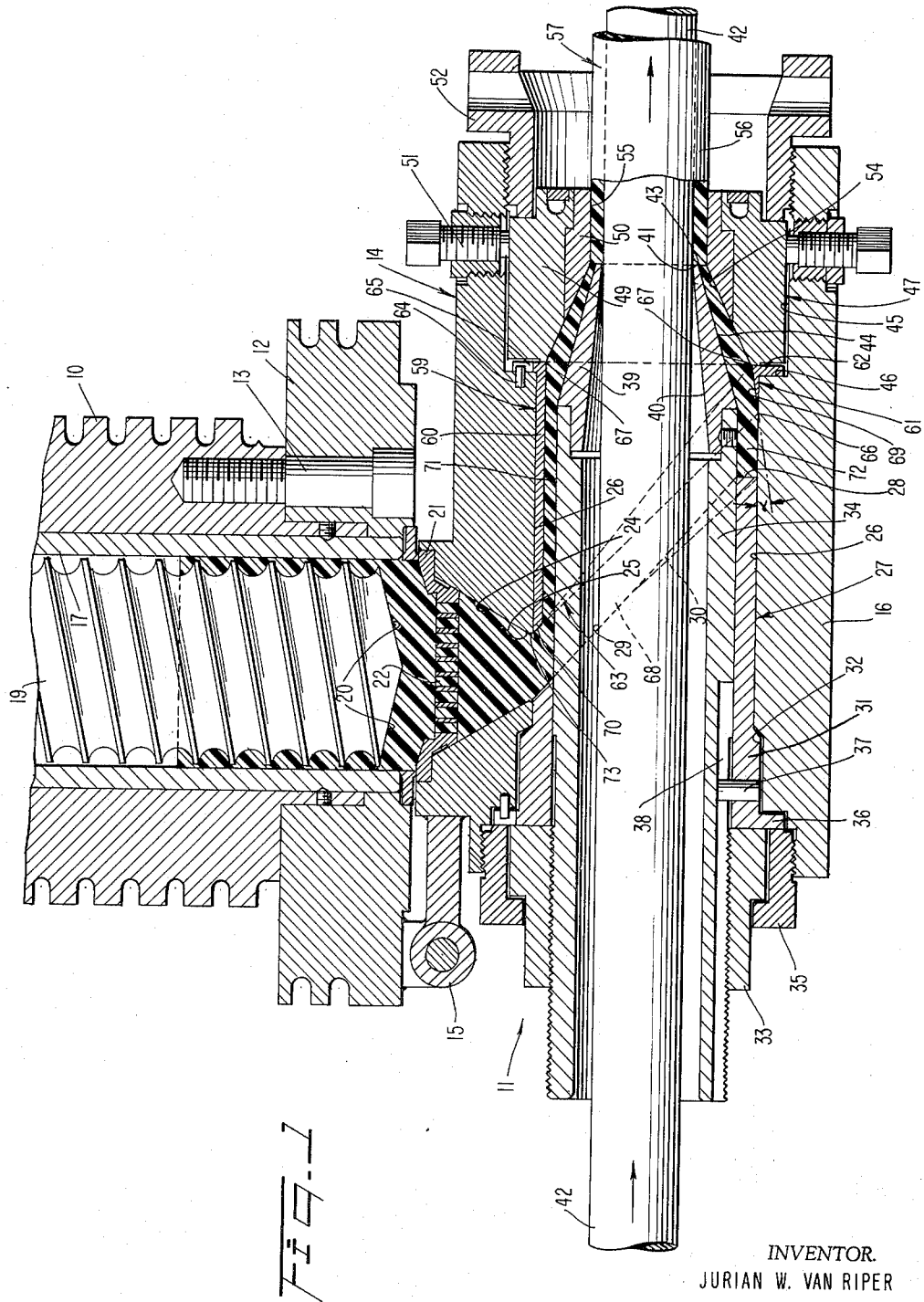

Sept. 21, 1965　　　　J. W. VAN RIPER　　　　3,206,802
PLASTIC MATERIAL EXTRUSION HEAD
Filed Oct. 14, 1963　　　　　　　　　　　　　3 Sheets-Sheet 1

INVENTOR.
JURIAN W. VAN RIPER
BY
Alfred W. Vibber
ATTORNEY

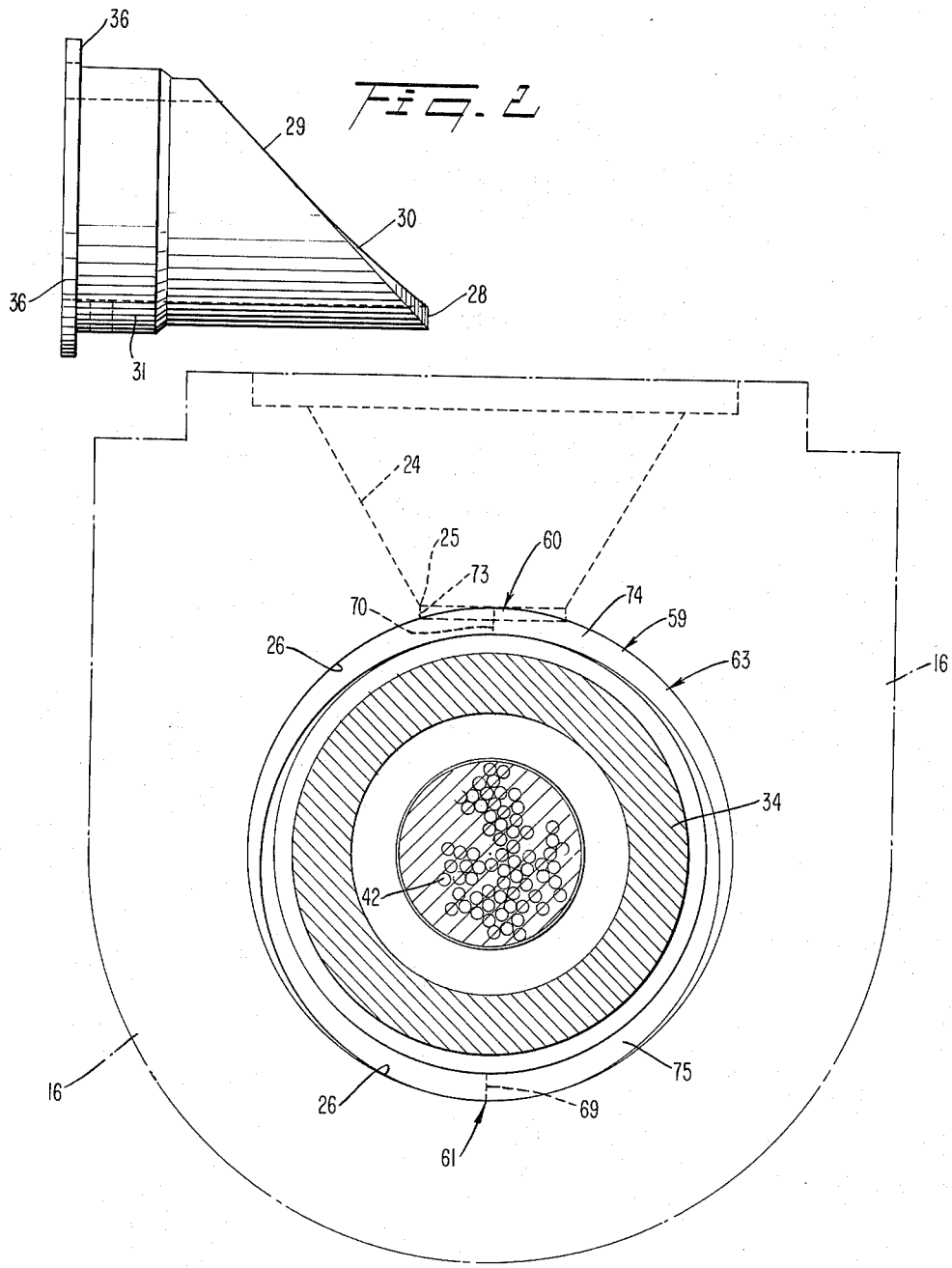

Sept. 21, 1965    J. W. VAN RIPER    3,206,802
PLASTIC MATERIAL EXTRUSION HEAD
Filed Oct. 14, 1963    3 Sheets-Sheet 3

INVENTOR.
JURIAN W. VAN RIPER
BY
Alfred W. Vibber
ATTORNEY

United States Patent Office 3,206,802
Patented Sept. 21, 1965

3,206,802
PLASTIC MATERIAL EXTRUSION HEAD
Jurian W. Van Riper, 208 Beechwood Road,
Ridgewood, N.J.
Filed Oct. 14, 1963, Ser. No. 315,995
6 Claims. (Cl. 18—13)

This invention relates to an extrusion head for plastic material extruding apparatus, and more particularly relates to a head for extruding plastic material of continuous annular cross section.

An example of an extrusion operation in which the extrusion head of the invention may be used to advantage is that in which a core such as a cable is fed through the head and during its travel therethrough is provided with a continuous sheath or coating of plastic material disposed thereabout. An extrusion head of this type is shown in applicant's prior patent, No. 2,943,352, dated July 5, 1960, of which the present invention represents an improvement.

In apparatus of such type, the extrusion head is of the cross-head type wherein the material, such as a cable core being sheathed, travels generally at right angles to the direction in which the plastic material is delivered under pressure to the extrusion head from the extruding machine. In such heads, difficulty has been experienced in the delivering of plastic material about the core in a uniform manner so that the core is accurately centered in the sheath, and the sheath is of substantially uniform dimensions and properties completely about its angular extent. The head shown and claimed in such prior Patent No. 2,943,352 controls the material flow in the chamber in the head by interposing in the head a flow-controlling block which is generally saddle-shaped, the side portions of the block extending outwardly on both sides to a location approaching the plane of the axis of the core material being sheathed. Such construction resulted in a pronounced improvement in the control of the flow of plastic material within the chamber in the head, particularly in the portion thereof which lies nearer the passage in the head through which plastic material is delivered to the chamber.

The construction of the head disclosed in such prior patent is, however, complicated as regards the flow-controlling block. The configuration of the block is complex, and thus such apparatus is fairly expensive to make. Further, because of the complex shape of the flow-controlling block, the head is difficult to clean; such cleaning is necessary, for example, at the end of one production run, particularly when the next run is to utilize a plastic material different from that of the previous run. Most importantly, perhaps, is the fact that the apparatus of the prior patent exercises a control of the flow of plastic material in the portion of the chamber thereof remote from the inlet passage of the chamber which is somewhat less accurate and precise than that optimumly desired to produce a product having the properties indicated above.

The plastic material extrusion head of the present invention, which is illustrated herein in connection with its use in sheathing a core, overcomes the above outlined difficulties in connection with prior extrusion heads of generally similar type, including lack of uniformity of flow of plastic material about the core, complexity of construction of the head, and difficulty of cleaning the head. The head of the present invention, for example, is markedly simpler in construction than that of Patent No. 2,943,352, is easier to make, more economical, and more efficient in its operation in controlling the flow of plastic material about the core. The present head is easily assembled and disassembled; because of its simplicity, it is easier to clean, since, as will be seen herein- below, when the flow-controlling tube thereof is removed, an unobstructed passage is left through the head. By use of the present invention, the same extrusion head can be used for extruding a large variety of different plastic materials whose hardness and durometer ratings extend over a wide range simply by substituting different flow-controlling tubes, in accordance with the invention in the extrusion head. With the present head, when the proper flow-controlling tube has been mounted therein the core being sheathed is self-centering regardless of the diameter of the core, a result which has not been possible before the present invention.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

Figure 4:
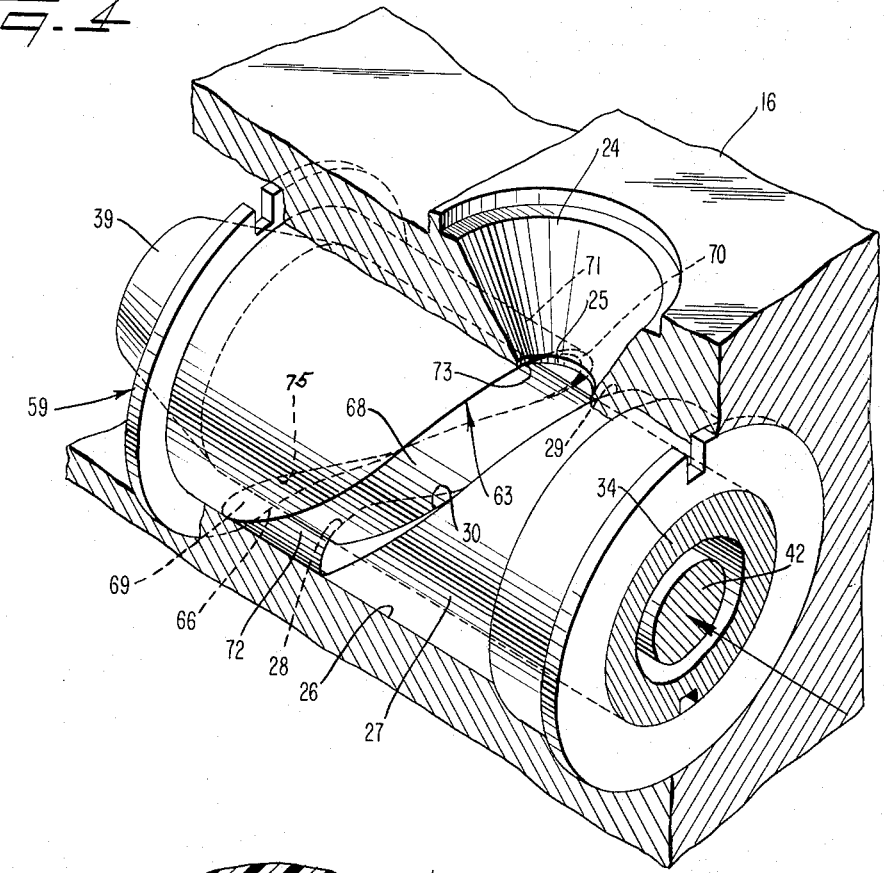
Figure 5:
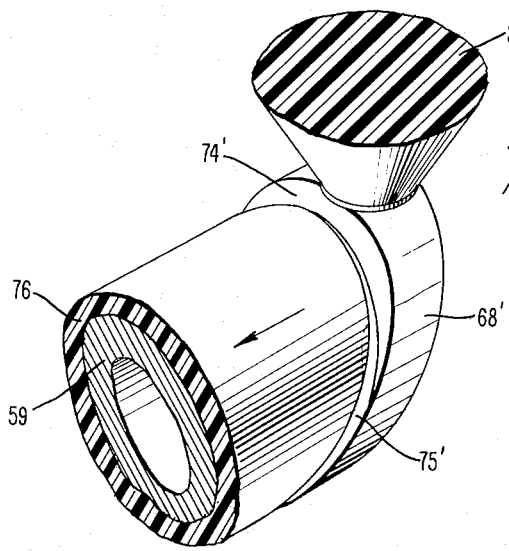

In the drawings, wherein like reference characters refer to like parts throughout the several views, FIG. 1 is a fragmentary view in horizontal axial section through a cross-head and a portion of an extrusion machine barrel in accordance with an illustrative preferred embodiment of the invention;

FIG. 2 is a view in side elevation of the sleeve-like member which defines the rear end of the plastic material receiving chamber within the head, and of the flow-controlling tube which forms the predominant part of the peripheral wall of the chamber within the head, the sleeve-like member and tube being shown in aligned operative position with respect to each other, portions of the surrounding structure of the head of FIG. 1 being shown in phantom lines;

FIG. 3 is a view in end elevation of the flow-controlling tube of the head of FIGS. 1 and 2, the view being taken in the direction from left to right in FIG. 1, the member 27 defining the rear end of the chamber being omitted, the flow controlling tube being shown mounted in portion 16 of the head (shown in phantom lines) and in operative association with the guider tube of the head and the cable therein, both of such last elements being shown in section;

FIG. 4 is a fragmentary view in perspective taken in a direction from the rear to the front of a portion of the illustrative cross-head at the location of the plastic material delivering and diverting means at the rear or inner end of the chamber in the cross-head, the plastic material being omitted for clarity of illustration; and FIG. 5 is a fragmentary view in perspective taken in the direction from front to rear of the plastic material as it is formed by the portion of the extrusion head shown in FIG. 4.

Turning now to FIG. 1 of the drawing, there is shown at 10 the outer end of the barrel of a screw-type extrusion machine, a sheathing cross-head, generally designated 11, having a fixed portion 12 which is secured to barrel 10 by a plurality of studs 13 (one shown) spaced angularly thereabout, connected to part 12 of the head by a hinge means 15, and by further studs (not shown) extending through the outer, movable part of the head and into part 12 thereof when the head is in operative, closed condition, is an outer head part 14. Plastic material under high pressure is forwarded to the head by a rotating extrusion screw 19 which is disposed in the bore of the barrel 10 so as to cooperate with the liner 17 in such bore in the manner shown.

The outer or free end of screw 19, which has a frusto-conical configuration as shown at 20, is spaced from and confronts a screen 22 which is disposed at the entering end of a converging frusto-conical inlet passage 24 disposed coaxial of screw 19 in the portion 14 of the head.

Plastic material thus flows from the end of the screw through the central passage through an annular sealing means 21 disposed between portion 14 of the head and the outer end of barrel 10, through the screen 22, and inwardly through the passage 24 into the chamber 68, to be described, in the extrusion head through the constricted annular inner end 25 of passage 24. The chamber 68 within the extrusion head is formed by and between the parts now to be described.

The body 16 of the outer part 14 of extrusion head 11 has a main bore 26 therethrough disposed coplanar with and at right angles to the axis of the screw 19 and thus of delivery passage 24. Accurately fitting within bore 26 is a first or rear sleeve-like member 27 which is generally of the construction disclosed and claimed in applicant's prior Patent No. 2,760,230. The forward or inner face of member 27 is divided into two zones. The first of such zones, which is designated 29 and lies nearer the screw 19, is in the form of a flat annular surface disposed generally at an angle of 45° with respect to the axis of member 27. The second of such zones, designated 30, is in the form of two symmetrical opposite side surfaces each in the form of a right helicoid. Such opposite side surfaces meet in a knife edge, shown at 28 in FIG. 1. The confronting ends of zones 29 and 30 merge along the vertical plane normal to the paper of FIG. 1 which passes through the axis of bore 26.

The rear of left hand end of the tubular member 27 is of enlarged outer diameter at 31 and then flanged at its rear end as shown at 36, portion 31 being received within an annular seat or counterbore 32 at the rear end of bore 26 in body 16. Accurately fitting within the longitudinal bore through member 27 is an elongated guider tube 34 which guides a core 42 which is to be sheathed in a manner to be explained. The guider tube 34 is provided at its rear end with an adjusting nut 33 which has threaded engagement therewith, as shown. The tube 27 and the guider tube 34 are secured within the head by a further nut 35 which has threaded engagement with a further counterbore at the rear end of body 16. The flange 36 on tube 27 is clamped between body 16 and nut 35. An inwardly extending flange on the outer end of nut 35 overlies an intermediate annular portion of nut 33 thus to retain the guider tube 34 in its adjusted longitudinal position. The guider tube 34 is held from turning with respect to tube 27 by a pin 37 which is tightly mounted in a radial hole in the portion 31 of tube 37, inner end of pin 37 having sliding engagement in a longitudinally extending slot 38 in the guider tube, as shown.

Fixed to the forward or inner end of the guider tube 34 is a core tip 39. Member 39 has a frusto-conical inner surface 40, surface 40 converging forwardly to the inner edge 41 thereof. Edge 41 has a diameter such that it accurately receives and forms a substantial seal with a material such as a cable core 42 which is being sheathed by the extrusion head of the invention as it passes through the head. Tip 39 has a forwardly converging frusto-conical outer surface 44 coaxial with surface 40 and converging forwardly. The apex angle of surface 44 somewhat exceeds that of the inner surface 40. The tip 39 has an annular end surface 43 which is disposed in a plane transverse to the axis of bore 26 and thus to the axis of the guider tube 34. Body 16 of the extrusion head has a second counterbore 45 at the forward end thereof. Counterbore 45 has mounted therewithin a die generally designated 47 which is formed of a die holder 49 and an inner replaceable annular die 50 therewithin. The die 47 may be appropriately adjusted within limits with respect to the axis of the guider tube 34 by two sets of opposed guide adjusting screws 51 disposed on diametral lines at right angles to each other. One such set of die adjusting screws 51 is shown in FIG. 1. The die 47 is retained against longitudinal movement in adjusted position in counterbore 45 by means of a die holding nut or sleeve 52 which has threaded engagement with the forward or outer end of the counterbore 45. The die holder 49 and the die 50 retained therein have a frusto-conical inner surface 54 which converges in the same direction as the outer surface 44 of the core guide tip 39, surface 54 having an inclination somewhat exceeding that of surface 44. The forward inner surface 55 of die 50 is of circular cylindrical configuration, the rear or inner end of surface 55 merging with the outer end of fructo-conical surface 54. Thus the surfaces 44 and 54 define an annular chamber of progressively decreasing radial width, such chamber delivering plastic material to the final, extruding material shaping and diameter defining surface 55 of the die.

As the core 42 is pulled through the head 11 in timed relationship with the delivery of plastic material to the head by the screw 19, there is thus formed an extruded sheath 56 of plastic material about the core 42. The sheathed core 42 with its covering 56 is designated as a whole by the reference character 57.

It will be seen on considering FIG. 1 that the plastic material leaving the constricted inner end 25 of the delivery passage 24 must travel an appreciably greater distance in surrounding and covering the surface of core 42 remote from the passage 24 than it does in surrounding and covering the surface of core 42 nearer the passage. The plastic material, being confined and thrust forwardly under high pressure, functions very much like a fluid, that is, it tends to take the path of least resistance. Such tendency is overcome in part by forming the rear end of the chamber 68 in the head in the form of a tube 27 having an end surface disposed generally at 45° with respect to the axis. Preferably, as disclosed, the second zone 30, remote from delivery passage 24, on the end of such tube is in the form of a right helicoid.

In order to supplement the action of the tube 27 and in order to control the flow of the plastic material effectively around the entire periphery of the chamber 68, the extrusion head of the present invention incorporates therein a novel flow-controlling tube which is generally designated by the reference character 59. Tube 59 has a portion 60 thereof, which lies nearest the delivery passage 24, of an axial length which very greatly exceeds the axial length of the portion 61 of the tube 59 which lies furthest from passage 24. In the embodiment shown, the tube 59 has an annular end surface 63 which lies substantially parallel to the surface 29 of tube 27 but is spaced appreciably forwardly thereof to define the chamber 68. Chamber 68, which extends completely about the outer surface of the guider tube 34, is such disposed, in the preferred illustrative embodiment, at an angle of substantially 45° with respect to the axis of guider tube 34, and is inclined forwardly in the direction outwardly away from delivery passage 24.

The tube 59 is retained in place in the forward end of bore 26 in the body 16 of the extrusion head by being provided with a radially outwardly extending flange 62 on its forward end, flange 62 being held in compression between end wall 46 of counterbore 45 and the rear surface of the die holder 49 by reason of the thrust imposed on the die holder by nut 52. Tube 59 is held in the correct angular orientation about its longitudinal axis by a longitudinally extending pin 64 affixed to body 16, the forward end of the pin being accurately received within a radial slot 65 in flange 62 of the tube 59.

The extrusion head of the present invention provides for the flow of plastic material under minimum back pressure at zone 61 of tube 59 and maximum back pressure at the zone 60 of such tube, the back pressure varying in a smooth, regular manner angularly about the tube between zones 60 and 61. To a large extent such variation in back pressure automatically follows from the disposition of the inner or rear end face 63, of tube 59 generally parallel to the forward end surface of the tube 27, that is, at an approximate angle of 45° with respect to the common axis of the guider tube 34 and of bore 26 in body 16 of the head. The plastic material leaving chamber 68 at zone 60 must travel a maximum distance axially of the head through the relatively narrow space between the inner surface of tube 59 and the outer surface of guider tube 34. At zones located progressively further outwardly from the inner end 25 of delivery passage 24 the plastic material leaving chamber 68 travels progressively shorter axial distance between the guider tube and the inner surface of tube 59, such axial distance reaching a minimum at zone 61. Thus, axial flow of plastic material from the chamber 68 is easiest, that is, takes place under the least back pressure, at zone 61, the back pressure progressively increasing equally around both sides of the guider tube 34 until it reaches a maximum at zone 60.

The described relationship between guider tube 34, flow-controlling tube 59, and bore 26 in portion 16 of the head compels plastic material flowing axially of tube 59 at zone 60 thereof immediately to enter the elongated restricted path 71. The plastic material which flows axially of tube 59 at and adjacent zone 61 of the tube has travelled almost directly from passage 24 outwardly through chamber 68 and into the outer end 72 of the chamber in advance of the rear edge of tube 59 at such zone. Thus flow of plastic material into portion 72 of the chamber, around the outer surface of the guider tube, and axially forwardly thereof at zone 61 is encouraged whereas axial flow of plastic material at and adjacent zone 60 is partially suppressed. It will also be seen that the axial distance through which the plastic material must flow between the guider tube 34 and the flow-controlling tube 59 progressively decreases from zone 60 to zone 61 in a symmetrical manner around both sides of the guider tube.

Further control over flow of plastic material axially forwardly from chamber 68 throughout the angular extent of the chamber around the central, longitudinal axis of the guider tube 34 and thus of the chamber is afforded by bevelling the axially rear, radially inner edge of the flow-controlling tube 59 in the manner most clearly shown in FIGS. 1 and 3. As there shown, the inner surface of tube 59 at zone 61 is bevelled so that it has a knife edge 66 at a point on its rear edge, lying on the plane of the 45° plane of surface 63 (FIG. 1), the radial thickness of the tube 59 at zone 61 thereof increasing in a forward direction until it reaches maximum thickness, equal to the uniform wall thickness of the tube at other, unbevelled zones thereof, at point 67, which lies on the forward surface of flange 62 on the tube. The geometrical element or line 69 connecting points 66 and 67 is straight, and lies at an angle α with respect to the longitudinal axis of the tube 59. Such bevelling of the radially inner rear edge of the tube 59 at the same angle α with respect to the axis of the tube is continued, but with a progressively shallower bevelling cut from zone 61 to zone 60 of tube 59, as most clearly shown in FIG. 3, so that at zone 60 the bevel disappears or in effect becomes zero. The unbevelled portion of the general surface 63 of tube 59 is designated 74. The bevelled portion of the general surface 63 is designated 75.

Considered in reverse, the rear end surface 63 of tube 59 has a straight geometrical element or line 70 at zone 60 in the plane containing the axes of passage 24, of the guider tube 34, and of the flow-controlling tube 59, such plane also containing the element 69. Element 70 lies in the general plane (45°) of surface 63 of tube 59. From element 70, symmetrically on both sides of the tube 59, the width of the rear end surface of the tube lying in such general plane progressively decreases, until it reaches a zero width at zone 61. The described configuration of the rear end of tube 59 both avoids the formation of zones with re-entrant angles in the chamber and in the path of flow of the plastic material, and progressively further reduces the back pressure upon the plastic material at zones of the chamber lying increasingly distant from the inner end 25 of the delivery passage 24.

The radially inner edge 67 at the forward end of tube 59 throughout its angular extent lies on a circle having the same radius as that of the smaller entering end of the frusto-conical surface 54, of the die holder 49. Thus plastic material leaving the tube 59 is led smoothly into the above described forwardly converging passage in the extrusion head leading to the inner surface 55 of the die 50.

FIG. 5 illustrates the shape of the plastic material as it is formed by the portion of the extrusion head shown in FIG. 4. As there shown, the plastic material flows through the passage 24 to form a frusto-conical shape 24', and flows into a shape 68' which is complementary to chamber 68 and which extends completely about the axis of the passage 26 in the extrusion head. The portion of the plastic material shown in FIG. 5 which is shaped by the unbevelled portion 74 of the general end surface 63 of tube 59 is designated 74'; the portion of plastic material shaped by the bevelled portion 75 of such end surface 63 is designated 75'. The annularly shaped plastic material 76 is that in the passage in the head as it leaves tube 59.

The effect of all of the above described factors and elements bearing upon the flow of plastic material in the head of the invention is to create a substantially uniform, optimum flow of plastic material through the die 50.

Such uniformity of flow through the die is not substantially affected despite changes in the diameter of the core 42 being sheathed, and/or the outer diameter of the sheathed product 57. The head of the invention may be readily adapted for use in such changed conditions within appreciable limits by the substitution of a different appropriate guider tube tip 39, and of a different appropriate die 50, wherever required. Because of the uniformity of flow of the plastic material past the material shaping surface 55 of the die the core 42 is automatically centered in the die, regardless of different diameters thereof within wide limits, and the sheath 56 thereon is thus of uniform radial thickness.

In the embodiment of head shown the surface 29 of tube 27 lies at an angle of 45° with respect to the axis of the bore 26, and a general plane of the inner end 63 of the flow-controlling tube 59 lies parallel to such surface 29. In the practice of the present invention it is sufficient for such conditions to be approximately or substantially maintained. Some deviation from the optimum 45° angle of inclination of surface 29 and the plane of surface 63 may, for example, be required by the application of the present invention of existing extrusion heads.

It is preferred that the inner end 25 of the delivery passage 24 merges directly with the outer edge of the flow-controlling tube 59 at and adjacent the zone 60 of such tube. This condition likewise is capable of considerable variation; in the illustrative embodiment the end 25 of passage 24 lies separated from the rear outer edge of tube 59 at zone 60 thereof by a short surface 73 extending parallel to the axis of the passage 24. The angle α in the embodiment of head shown has a value of approximately 12°. Such angle likewise is capable of considerable variation and depends primarily upon the flow characteristics of the plastic material being extruded. The angle α is so chosen for each plastic material that the effect of the bevel taken with the other flow modifying and controlling factors discussed above results in uniform speed of axial flow of the extruded plastic material through the die 50 at each of the zones located angularly thereabout.

It is preferred, as shown, that the tube 59 shall extend in the zone 60 thereof throughout the length of the bore 26 in the portion 16 of the head. Thus, as shown in FIG. 1, at zone 60 tube 59 extends from the inner end 25 of the delivery channel 24 to a position slightly beyond the forward end of bore 26.

The forward inner circular edge 67 of tube 59 in the embodiment shown overlies the frusto-conical surface 44 of the guider tube tip 39. Such positioning of edge 67 relative to element 39 is not critical, however, the guider tube 34 and the tip 39 thereof being capable of axial adjustment as above explained. The guider tube and tip are preferably adjusted so that the end surface 43 of tip 39 lies substantially in the same transverse plane as the rear entering end of the surface 55 of the die 50.

When it is necessary to clean the head, rotation of the screw 19 is stopped and the head is opened by removing the retaining studs and springing part 14 of the head outwardly on the hinge means 15. This results in the breaking of the plastic material within the head at a location generally at the constricted inner end 25 of the delivery passage 24. Thereupon the die holder and the flow-controlling tube 59 can readily be removed from the forward end of part 14 of the head and the sleeve-like member 27 and the guider tube 34 can be removed from the rear end of the head at 14. After such parts have been cleaned and various of the parts replaced as required by the characteristics of the plastic material next to be extruded, the head may be immediately put into operation without requiring appreciable, if any, adjustment of the various parts of the head.

The axial length of the flow-controlling tube 59 should ideally be made as short as possible, thus producing the greatest difference in the frictional resistance to flow of the plastic material between zones 60 and 61. Under such conditions a small change in the inner diameter of tube 59 will produce the greatest difference in the axial flow characteristics of the extrusion head between zone 60, lying nearer the delivery passage 24, and zone 61, lying furthest from the delivery passage.

The delivery passage 24 and the bore 26, and flow-controlling sleeve or tube 59 forming the chamber 68 are so arranged that there are no re-entrant angles anywhere in the wall of the plastic material conducting structure of the head from and including the passage 24 to the passage 44, 54 leading to the die. Thus the junctures between any two contiguous parts in such portion of the head are always at angles of 90° and above. The bevelling of the radially inner rear edge of the member 59 in the described manner permits such condition to be achieved at the juncture between the member 59 and bore 26. Because of such construction, there are no zones in which stagnation and possible burning of the plastic material may occur. Instead, flow of the plastic material takes place at all points in a regular manner, so that fresh material is constantly presented to all zones of the material conducting surfaces of the head, including the zones at which the material passes from one element of the head to another.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

Thus the extrusion head of the invention can be used to advantage in the making of an extruded tube, by substituting a solid mandrel head for guider tube tip 39, such mandrel head having a central stationarily held circular cylindrical forward end portion lying coaxially within and spaced from the surface 55 of the die, to define the inner wall of the tube forming die passage.

I claim as new the following:

1. Apparatus for extruding plastic material in continuous tubular form, said apparatus having means for delivering plastic material under pressure, a head disposed on the mechanism and having a bore for receiving plastic material from the delivering means, a delivery passage interposed between the delivering means and the bore, a die at the forward end of the bore for shaping the plastic material as it passes out of the head, a central member in the bore of the head extending across the open end of the delivery passage toward the die, means closing the rear end of the bore and having an annular surface surrounding the central member, said surface facing the die and diverting the plastic material toward the die as it passes through the bore from the delivering means, the portion of such annular surface nearer the die lying across at least a portion of the delivery passage and slanting at an angle on the order of 45° with respect to the axis of the bore in a direction outwardly of the delivery passage and forwardly of the bore, a separate and removable sleeve-like member surrounding and radially spaced from the central member at the forward end of the bore and having a rear end axially spaced from and generally parallel to the annular surface to form an inclined plastic material receiving chamber therebetween, the rear end of the sleeve-like member at the zone thereof nearest the delivery passage extending substantially to the juncture between the delivery passage and the bore in the head, the forward end of the sleeve-like member extending substantially to the forward end of the bore in the head, said chamber extending completely around said central member, the annular space between the inner surface of the sleeve-like member and the central member conducting plastic material from the chamber toward the die, the radially inner edge at the rear end of the sleeve-like member being bevelled at varying radial depths throughout at least a predominant part of its circumference, said bevel having its maximum depth at the axially forwardmost zone of the rear end of the sleeve-like member and its minimum depth adjacent the axially rearmost zone of the rear end of the sleeve-like member.

2. Apparatus for extruding plastic material in continuous tubular form, said apparatus having means for delivering plastic material under pressure, a head disposed on the mechanism and having a bore for receiving plastic material from the delivering means, a delivery passage interposed between the delivering means and the bore, a die at the forward end of the bore for shaping the plastic material as it passes out of the head, a central member in the bore of the head extending across the open end of the delivery passage toward the die, a first annular sleeve-like member accurately fitting within the rear end of the bore, and surrounding and accurately fitting about the central member, said first annular member having a forward plastic material diverting end facing the die for diverting the plastic material toward the die as it passes through the bore from the delivering means, the portion of such annular surface nearer the die lying across at least a portion of the delivery passage and slanting at an angle of approximately 45° with respect to the axis of the bore in a direction outwardly of the delivery passage and forwardly of the bore, and a second separate and removable annular sleeve-like member accurately fitting within the bore, surrounding, and radially spaced from the central member at the forward end of the bore and having a rear end axially spaced from and generally parallel to the forward end of the first annular member to form an inclined plastic material receiving chamber therebetween, said chamber extending completely around said central member, the annular space between the inner surface of the second sleeve-like member and the central member providing a passage for conducting plastic material from the chamber toward the die, the radially inner edge at the rear end of the second sleeve-like member being bevelled at varying radial depths throughout at least a predominant part of its circumference, said bevel having its maximum depth at the axially forwardmost zone of the rear end of the second sleeve-like member and its minimum depth adjacent the axially rearmost zone of the rear end of the second sleeve-like member.

3. Extrusion apparatus as claimed in claim 2, wherein the axially forwardmost zone of the rear end of the second sleeve-like member is substantially in the form of a knife edge, the radial width of the rear edge of the second sleeve-like member increasing uniformly in both circumferential directions from said axially forwardmost zone toward the axially rearmost zone thereof.

4. Apparatus for sheathing a core with plastic material, said apparatus having means for delivering plastic material under pressure, a cross-head disposed on the mechanism and having an axial bore for receiving plastic material from the delivering means, a delivery passage interposed between the delivering means and the bore, a die at the forward end of the bore for shaping the plastic material as it passes out of the cross-head, a central tubular member in the bore of the cross-head extending across the open end of the delivery passage toward the die, said tubular member receiving and guiding the core being sheathed by the mechanism, the forward end of said tubular member lying rearwardly of the die, a first annular sleeve-like member accurately fitting within the rear end of the bore, and surrounding and accurately fitting about said tubular member, said first annular member having a forward plastic material diverting end facing the die for diverting the plastic material toward the die as it passes through the bore from the delivering means, the portion of such annular surface nearer the die lying across at least a portion of the delivery passage and slanting at an angle of approximately 45° with respect to the axis of the bore in a direction outwardly of the delivery passage and forwardly of the bore, and a second separate and removable annular sleeve-like member accurately fitting within the bore, surrounding, and radially spaced from the central member at the forward end of the bore and having a rear end axially spaced from and generally parallel to the forward end of the first annular member to form an inclined plastic material receiving chamber therebetween, said chamber extending completely around said central member, the annular space between the inner surface of the second sleeve-like member providing a passage surrounding the core for conducting plastic material from the chamber toward the die, the radially inner edge at the rear end of the second sleeve-like member being bevelled at varying radial depths throughout at least a predominant part of its circumference, said bevel having its maximum depth at the axially forwardmost zone of the rear end of the second sleeve-like member and its minimum depth adjacent the axially rearmost zone of the rear end of the second sleeve-like member.

5. Core sheathing apparatus as claimed in claim 4, wherein the radially inner edge of the second annular member is bevelled at varying radial depths therearound, at substantially a constant angle with respect to the axis of the second annular member, said bevel having its maximum depth at the axially forwardmost zone of the rear end of the second annular member and its minimum depth at the axially rearmost zone of the rear end of the second annular member.

6. Core sheathing apparatus as claimed in claim 4, wherein the opposite sides of the forward end of the first annular member is generally that half thereof further from the delivery passage are generally mirror images of each other and generally of right helicoid shape.

References Cited by the Examiner

UNITED STATES PATENTS

| 2,760,230 | 8/56 | Van Riper | 18—13 |
| 2,943,352 | 7/60 | Van Riper | 18—13 |
| 2,952,871 | 9/60 | Loeser | 18—14 X |

FOREIGN PATENTS

| 1,210,419 | 9/59 | France. |
| 1,139,970 | 11/62 | Germany. |

J. SPENCER OVERHOLSER, *Primary Examiner.*

MICHAEL V. BRINDISI, *Examiner.*

UNITED STATES PATENT OFFICE
CERTIFICATE OF CORRECTION

Patent No. 3,206,802 September 21, 1965

Jurian W. Van Riper

It is hereby certified that error appears in the above numbered patent requiring correction and that the said Letters Patent should read as corrected below.

Column 10, line 25, for "is" read -- in --.

Signed and sealed this 22nd day of March 1966.

(SEAL)
Attest:

ERNEST W. SWIDER  
Attesting Officer

EDWARD J. BRENNER  
Commissioner of Patents